(12) United States Patent
Zhu

(10) Patent No.: US 11,904,890 B2
(45) Date of Patent: Feb. 20, 2024

(54) LANE CHANGE SYSTEM FOR LANES WITH DIFFERENT SPEED LIMITS

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 487 days.

(21) Appl. No.: 16/904,205

(22) Filed: Jun. 17, 2020

(65) Prior Publication Data
US 2021/0394786 A1 Dec. 23, 2021

(51) Int. Cl.
*B60W 60/00* (2020.01)
*B60W 30/18* (2012.01)

(52) U.S. Cl.
CPC .. *B60W 60/0011* (2020.02); *B60W 30/18163* (2013.01)

(58) Field of Classification Search
CPC .......... B60W 60/001; B60W 60/0011; B60W 30/18163; B60W 2555/60; B60W 2520/10; B60W 10/06; B60W 10/18; B60W 10/20; B60W 2420/40; B60W 2420/42; B60W 2420/52; B60W 2420/54; B60W 2510/0604; B60W 2510/18; B60W 2710/06; B60W 2710/18; B60W 2710/20
See application file for complete search history.

(56) References Cited

U.S. PATENT DOCUMENTS 9,672,734 B1 * 6/2017 Ratnasingam .......... H04W 4/44
9,884,625 B2 * 2/2018 Taira ..................... B60W 10/04
10,267,634 B2 * 4/2019 Chen .................. G01C 21/3602
10,353,390 B2 * 7/2019 Linscott ............. G01C 21/3407
11,097,777 B2 * 8/2021 Resch ................. B62D 15/0255
(Continued)

FOREIGN PATENT DOCUMENTS

CN 106767866 A * 5/2017 ............. G01C 21/20
CN 111923910 B * 1/2021
(Continued)

OTHER PUBLICATIONS

Y. Guo, H. Xu, Y. Zhang and D. Yao, "Integrated Variable Speed Limits and Lane-Changing Control for Freeway Lane-Drop Bottlenecks," in IEEE Access, vol. 8, pp. 54710-54721, 2020, doi: 10.1109/ACCESS.2020.2981658. (Year: 2020).*

*Primary Examiner* — Angelina Shudy
(74) *Attorney, Agent, or Firm* — WOMBLE BOND DICKINSON (US) LLP

(57) ABSTRACT

Embodiments disclose a method and a system to operate an autonomous driving vehicle (ADV). In one embodiment, a system determines a source lane speed limit (SLSL) for a source lane (SL) and a target lane speed limit (TLSL) for a target lane (TL), where the SLSL is greater than the TLSL. The system generates a first trajectory for the ADV to follow the SL, the first trajectory having a modified speed corresponding to the TLSL instead of the SLSL. The system generates a second trajectory for the ADV to change from the SL to the TL, the second trajectory having a speed corresponding to the TLSL. The system determines a first cost and a second cost for the first trajectory and the second trajectory respectively based on a cost function for comparison. The system controls the ADV according to a trajectory with a lowest cost.

21 Claims, 8 Drawing Sheets

(56) References Cited

U.S. PATENT DOCUMENTS

| | | | | |
|---|---|---|---|---|
| 11,186,276 B2* | 11/2021 | Tao | | G05D 1/0223 |
| 11,407,419 B2* | 8/2022 | Zhu | | B60W 60/0027 |
| 11,485,360 B2* | 11/2022 | Zhu | | B60W 60/0027 |
| 11,590,975 B2* | 2/2023 | Fujimaki | | B60W 30/10 |
| 11,643,073 B2* | 5/2023 | Dax | | G08G 1/09626 |
| | | | | 701/301 |
| 11,738,772 B1* | 8/2023 | Beller | | B60W 30/09 |
| | | | | 701/26 |
| 2005/0015203 A1* | 1/2005 | Nishira | | B60W 50/16 |
| | | | | 340/436 |
| 2010/0191436 A1* | 7/2010 | Hellmann | | B60W 30/146 |
| | | | | 701/96 |
| 2010/0324771 A1* | 12/2010 | Yabushita | | G05D 1/024 |
| | | | | 701/25 |
| 2013/0275033 A1* | 10/2013 | Bastiaensen | | G01C 21/26 |
| | | | | 701/119 |
| 2013/0282264 A1* | 10/2013 | Bastiaensen | | G08G 1/0145 |
| | | | | 701/119 |
| 2014/0058673 A1* | 2/2014 | Wolf | | G01C 21/3484 |
| | | | | 701/533 |
| 2015/0142207 A1* | 5/2015 | Flehmig | | B60W 30/18163 |
| | | | | 701/1 |
| 2015/0367845 A1* | 12/2015 | Sannodo | | B60W 10/20 |
| | | | | 701/23 |
| 2016/0304097 A1* | 10/2016 | Taira | | B60W 10/20 |
| 2016/0339913 A1* | 11/2016 | Yamashita | | B60W 30/146 |
| 2016/0347175 A1* | 12/2016 | Yamashita | | B60K 31/00 |
| 2017/0008522 A1* | 1/2017 | Sato | | B60W 10/04 |
| 2017/0082452 A1* | 3/2017 | Sumizawa | | B60W 60/001 |
| 2017/0089717 A1* | 3/2017 | White | | G08G 1/0112 |
| 2017/0120909 A1* | 5/2017 | Oniwa | | B60W 30/143 |
| 2017/0120912 A1* | 5/2017 | Ishioka | | B60W 30/16 |
| 2017/0320500 A1* | 11/2017 | Yoo | | B60W 30/18163 |
| 2017/0341653 A1* | 11/2017 | Kubota | | G01C 21/3658 |
| 2017/0364083 A1* | 12/2017 | Yang | | G01C 21/3407 |
| 2018/0099676 A1* | 4/2018 | Goto | | B62D 15/0255 |
| 2018/0148051 A1* | 5/2018 | Lujan | | B60W 30/0956 |
| 2018/0267548 A1* | 9/2018 | Sumioka | | B60W 30/09 |
| 2018/0281787 A1* | 10/2018 | Shiota | | B60T 8/17567 |
| 2018/0345963 A1* | 12/2018 | Maura | | G05D 1/0088 |
| 2019/0023273 A1* | 1/2019 | Ishioka | | G01C 21/26 |
| 2019/0025067 A1* | 1/2019 | Bärecke | | G06V 20/58 |
| 2019/0077402 A1* | 3/2019 | Kim | | B60W 30/12 |
| 2019/0121363 A1* | 4/2019 | Roth | | G01C 21/3492 |
| 2019/0152525 A1* | 5/2019 | Resch | | G01C 21/34 |
| 2019/0171206 A1* | 6/2019 | Abrams | | B60W 40/02 |
| 2019/0184994 A1* | 6/2019 | Mizuno | | G06V 20/58 |
| 2019/0241198 A1* | 8/2019 | Mori | | G08G 1/16 |
| 2019/0279502 A1* | 9/2019 | Fowe | | G08G 1/096716 |
| 2019/0317511 A1* | 10/2019 | Xu | | B60W 30/09 |
| 2019/0317522 A1* | 10/2019 | Yang | | B60W 30/18163 |
| 2019/0322281 A1* | 10/2019 | Wang | | G01C 21/3658 |
| 2019/0347175 A1* | 11/2019 | Panis | | G06F 11/221 |
| 2019/0347939 A1* | 11/2019 | Kim | | B60K 35/00 |
| 2019/0362633 A1* | 11/2019 | Kiryu | | G06V 20/58 |
| 2019/0383626 A1* | 12/2019 | Fowe | | G08G 1/0133 |
| 2019/0383629 A1* | 12/2019 | Lee | | B60W 50/0097 |
| 2020/0004251 A1* | 1/2020 | Zhu | | G05D 1/0257 |
| 2020/0018609 A1* | 1/2020 | Nagy | | G01C 21/3415 |
| 2020/0023842 A1* | 1/2020 | Gutierrez | | B60W 50/14 |
| 2020/0031340 A1* | 1/2020 | Tao | | G05D 1/0223 |
| 2020/0110414 A1* | 4/2020 | Dupre | | B60W 60/0011 |
| 2020/0132488 A1* | 4/2020 | Slutskyy | | B60W 60/0011 |
| 2020/0132498 A1* | 4/2020 | Matsumaru | | G08G 1/096844 |
| 2020/0139959 A1* | 5/2020 | Akella | | B60W 60/0015 |
| 2020/0180633 A1* | 6/2020 | Wu | | B60W 30/18163 |
| 2020/0180636 A1* | 6/2020 | Oh | | B60W 30/18163 |
| 2020/0182633 A1* | 6/2020 | Liu | | G01C 21/3407 |
| 2020/0183419 A1* | 6/2020 | Teng | | G08G 1/22 |
| 2020/0189608 A1* | 6/2020 | Braley | | B60W 50/029 |
| 2020/0216064 A1* | 7/2020 | du Toit | | B60W 30/18163 |
| 2020/0231150 A1* | 7/2020 | Takahashi | | G07C 5/008 |
| 2020/0298858 A1* | 9/2020 | Stenneth | | G08G 1/167 |
| 2020/0307568 A1* | 10/2020 | Takahashi | | B60W 60/0011 |
| 2020/0307579 A1* | 10/2020 | Mizoguchi | | B62D 15/0255 |
| 2020/0307589 A1* | 10/2020 | Li | | B60W 60/0023 |
| 2020/0307691 A1* | 10/2020 | Kalabic | | B62D 15/025 |
| 2020/0385024 A1* | 12/2020 | Wongpiromsarn | | |
| | | | | G01C 21/3407 |
| 2020/0394562 A1* | 12/2020 | Nonaka | | B60W 30/188 |
| 2020/0398849 A1* | 12/2020 | Kanoh | | G08G 1/16 |
| 2021/0004012 A1* | 1/2021 | Marchetti-Bowick | | |
| | | | | G01C 21/3446 |
| 2021/0009128 A1* | 1/2021 | Jokela | | B60W 30/162 |
| 2021/0041882 A1* | 2/2021 | Lacaze | | G05D 1/0223 |
| 2021/0063181 A1* | 3/2021 | Saleh | | G01C 21/3446 |
| 2021/0064044 A1* | 3/2021 | Refaat | | G06N 3/08 |
| 2021/0094539 A1* | 4/2021 | Beller | | G05D 1/0221 |
| 2021/0109539 A1* | 4/2021 | Kobilarov | | B60W 60/0011 |
| 2021/0114617 A1* | 4/2021 | Phillips | | B60W 30/0956 |
| 2021/0129834 A1* | 5/2021 | Gier | | B60W 60/0011 |
| 2021/0129866 A1* | 5/2021 | Yaskevich | | G01C 21/3469 |
| 2021/0133466 A1* | 5/2021 | Gier | | G05D 1/0223 |
| 2021/0171042 A1* | 6/2021 | Hayakawa | | B60W 40/04 |
| 2021/0173402 A1* | 6/2021 | Chang | | B60W 40/09 |
| 2021/0188327 A1* | 6/2021 | Otliga | | G08G 1/166 |
| 2021/0197813 A1* | 7/2021 | Houston | | G05D 1/0223 |
| 2021/0200222 A1* | 7/2021 | Zhu | | G08G 1/0133 |
| 2021/0200231 A1* | 7/2021 | Zhu | | G05D 1/0223 |
| 2021/0237769 A1* | 8/2021 | Ostafew | | B60W 30/18159 |
| 2021/0245782 A1* | 8/2021 | Zhu | | G05D 1/0088 |
| 2021/0300371 A1* | 9/2021 | Sindhuja | | B60W 30/18163 |
| 2021/0300412 A1* | 9/2021 | Dingli | | B60W 50/0098 |
| 2021/0316733 A1* | 10/2021 | Mizoguchi | | B60W 30/146 |
| 2021/0339741 A1* | 11/2021 | Rezvan Behbahani | | |
| | | | | B60W 40/04 |
| 2022/0026224 A1* | 1/2022 | Zhao | | G05D 1/0219 |
| 2022/0041165 A1* | 2/2022 | Katsuki | | G05D 1/0221 |
| 2022/0048513 A1* | 2/2022 | Xu | | B60W 60/00274 |
| 2022/0073099 A1* | 3/2022 | Park | | B60W 30/146 |
| 2022/0081006 A1* | 3/2022 | Kang | | B60W 60/0027 |
| 2022/0135029 A1* | 5/2022 | Poubel Orenstein | | |
| | | | | B60W 30/0956 |
| | | | | 701/301 |
| 2022/0135039 A1* | 5/2022 | Jardine | | B60W 30/18159 |
| | | | | 701/26 |
| 2022/0135077 A1* | 5/2022 | Moon | | B60W 50/14 |
| | | | | 701/26 |
| 2022/0138686 A1* | 5/2022 | Neumann | | G06N 20/00 |
| | | | | 705/7.15 |
| 2022/0185289 A1* | 6/2022 | Arora | | B62D 15/0265 |
| 2022/0234614 A1* | 7/2022 | Frazzoli | | B60W 30/143 |
| 2022/0306102 A1* | 9/2022 | Kudo | | B60W 30/12 |
| 2022/0316898 A1* | 10/2022 | Mayster | | G01C 21/3469 |
| 2022/0351625 A1* | 11/2022 | Qi | | B60W 60/0027 |
| 2022/0355820 A1* | 11/2022 | Bruno | | B60W 30/0956 |
| 2022/0371618 A1* | 11/2022 | Vora | | G08G 1/096725 |
| 2022/0379917 A1* | 12/2022 | Henke | | B60W 60/0011 |
| 2023/0074387 A1* | 3/2023 | Goyal | | G01C 21/3407 |
| 2023/0074873 A1* | 3/2023 | Sredzki | | B60W 30/0953 |

FOREIGN PATENT DOCUMENTS

| | | | | |
|---|---|---|---|---|
| DE | 102010060066 A1 * | 5/2011 | | B60Q 1/346 |
| EP | 3900997 A1 * | 10/2021 | | B60W 30/0953 |
| JP | 2011038794 A * | 2/2011 | | |
| RU | 2738491 C1 * | 12/2020 | | B60W 30/10 |
| WO | WO-2021077725 A1 * | 4/2021 | | B60W 30/08 |

* cited by examiner

LANE CHANGE SYSTEM FOR LANES WITH DIFFERENT SPEED LIMITS

TECHNICAL FIELD

Embodiments of the present disclosure relate generally to operating autonomous driving vehicles. More particularly, embodiments of the disclosure relate to a lane change system for lanes with different speed limits for autonomous driving vehicles (ADV).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Some roads have different speed limits for different lanes. A problem arises when an ADV in a lane with a higher speed limit cannot change to a lane with a lower speed limit (e.g., to eventually exit a freeway or to make a right turn) because the lane with the higher speed limit is the preferred lane to reach a destination without delays. The lane change would then be carried out at the last minute in order for the ADV to stay on a planned route.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments disclose a method and a system to operate an autonomous driving vehicle (ADV). In one embodiment, a system determines a source lane speed limit (SLSL) for a source lane (SL) and a target lane speed limit (TLSL) for a target lane (TL), where the SLSL is greater than the TLSL. The system generates a first trajectory for the ADV to follow the SL, the first trajectory having a modified speed corresponding to the TLSL instead of the SLSL. The system generates a second trajectory for the ADV to change from the SL to the TL, the second trajectory having a speed corresponding to the TLSL. The system determines a first cost and a second cost for the first trajectory and the second trajectory respectively based on a cost function. The system compares the costs for the first trajectory and the second trajectory. If the second trajectory has a lower cost than the first trajectory, the system controls the ADV according to the second trajectory to change lanes from the SL to the TL.

Figure 1:
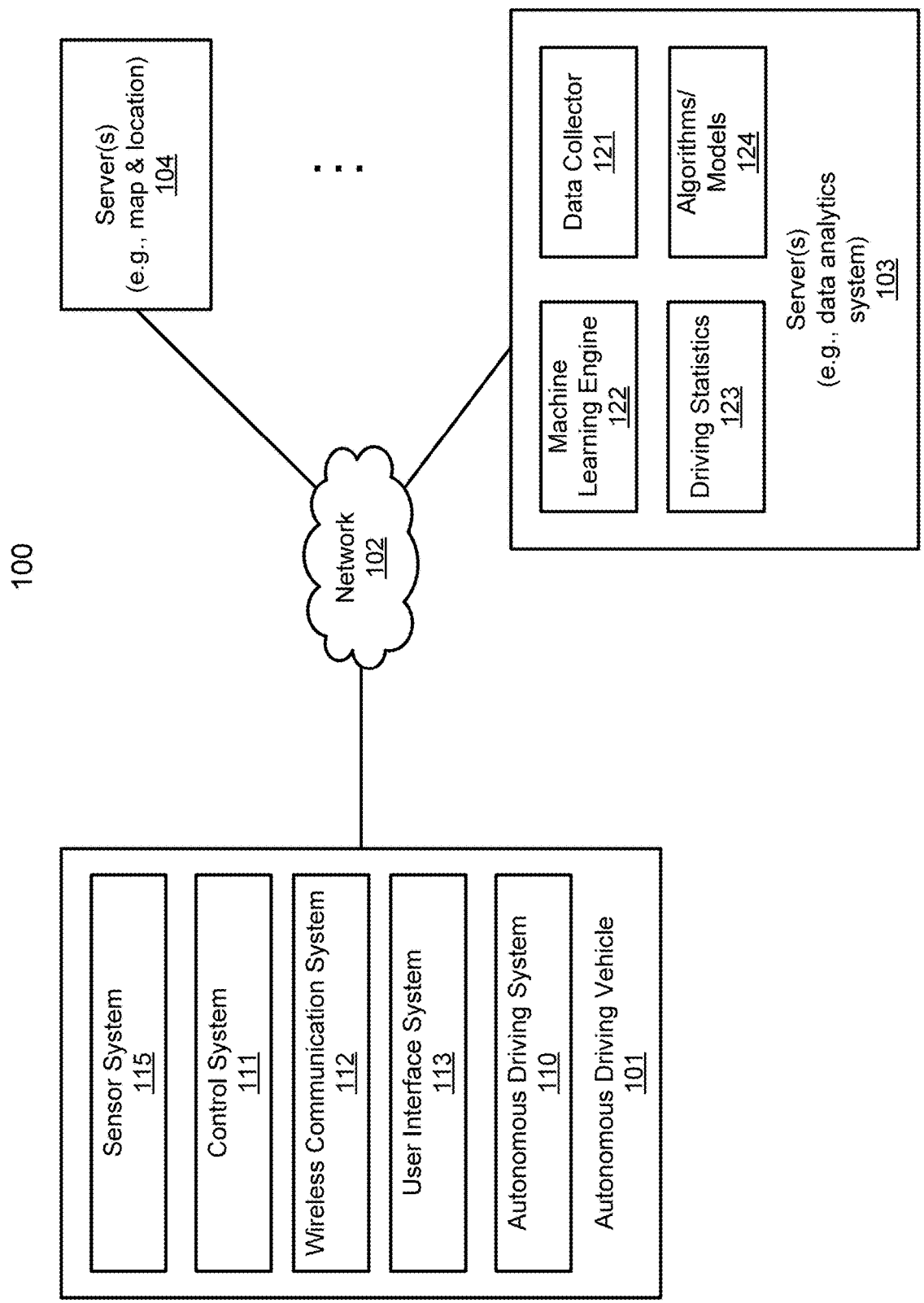
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
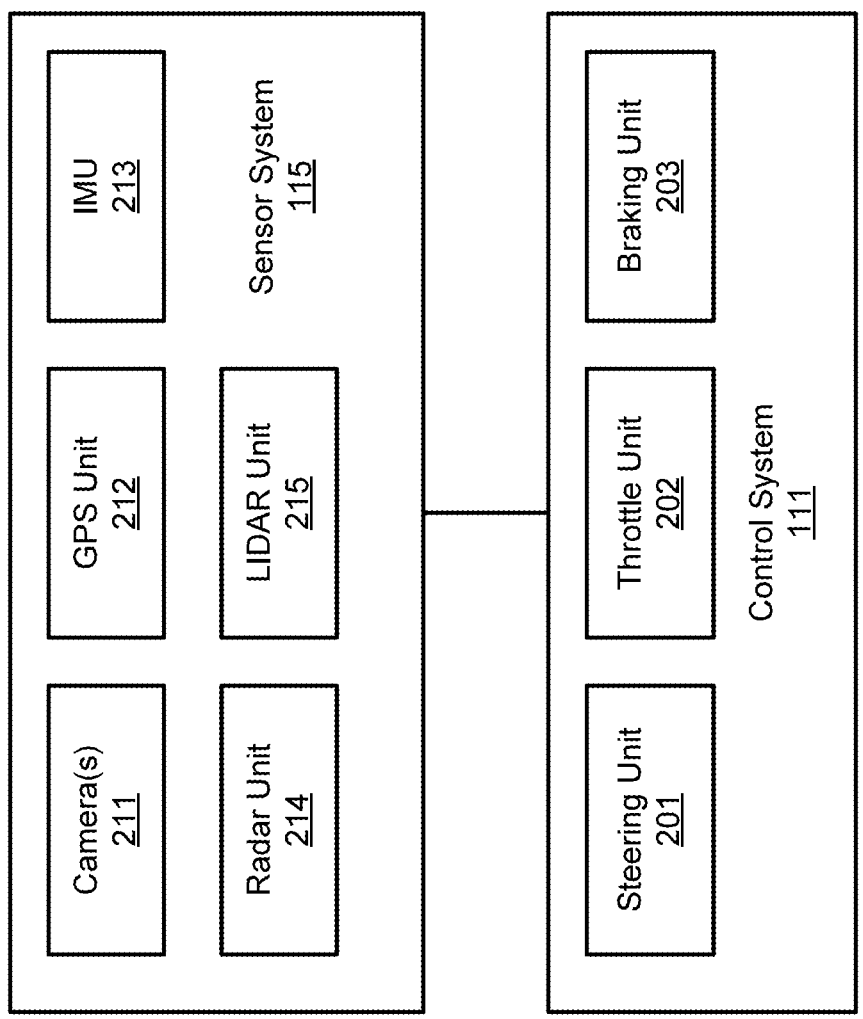
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include one or more algorithms to change lanes with different speed limits of the lanes, which will be described in details further below. Algorithms 124 can then be uploaded on ADVs to be utilized during autonomous driving in real-time.

Figure 3A:
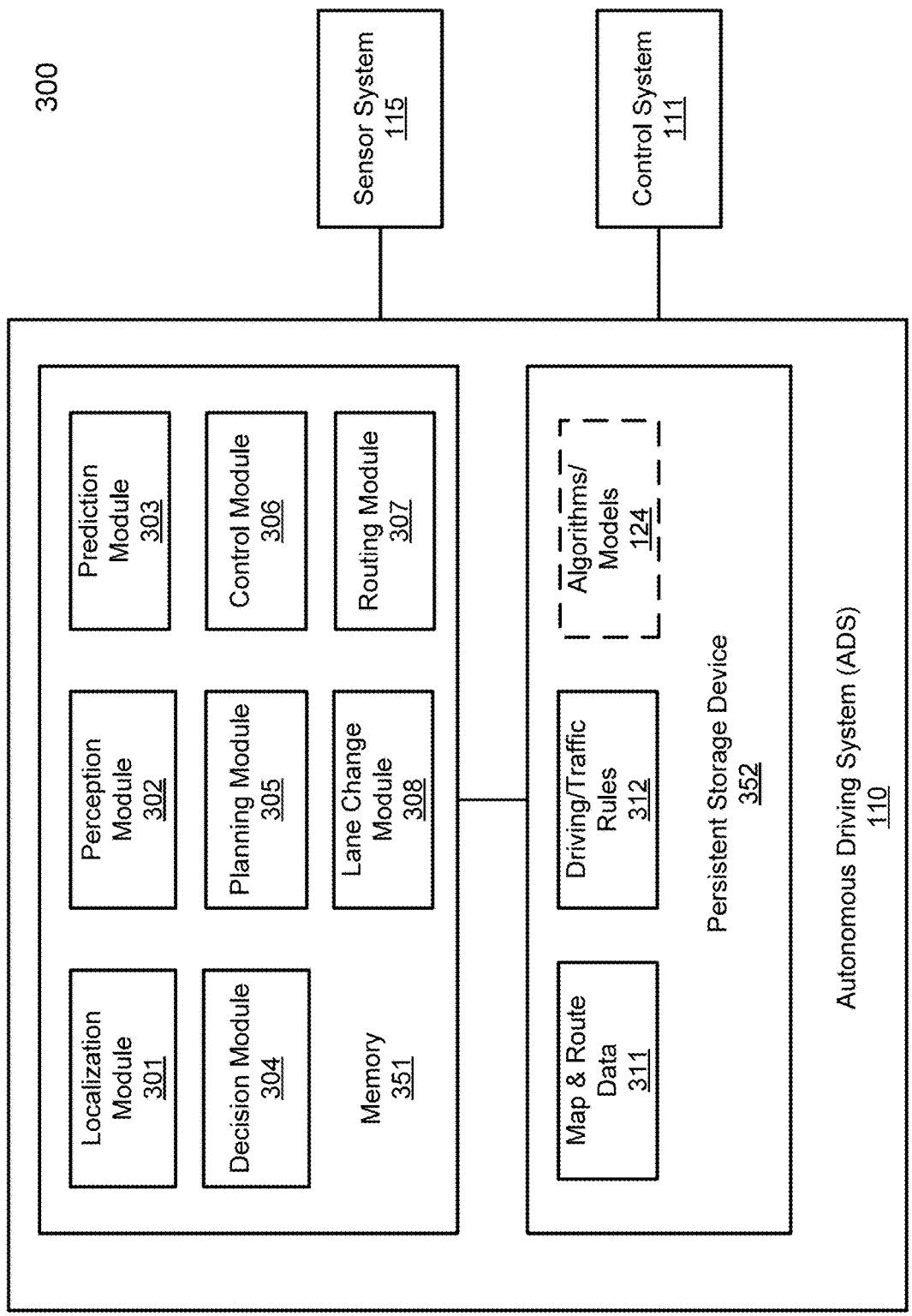
FIGS. 3A-3B are block diagrams illustrating an example of an autonomous driving system used with an autonomous driving vehicle according to one embodiment.
Figure 3B:
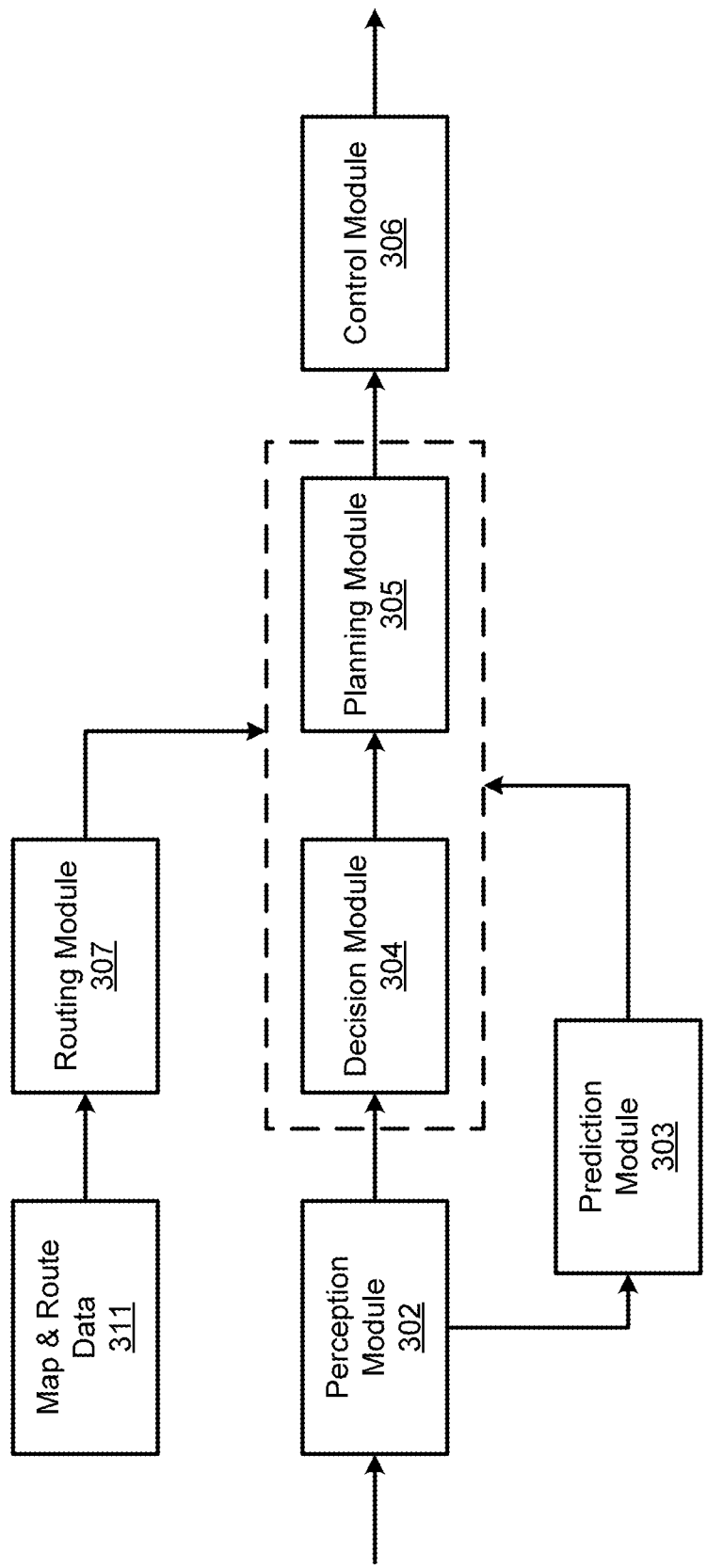

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and lane change module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, lane changing module 308 may be implemented as a part of planning module 305.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection.

If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
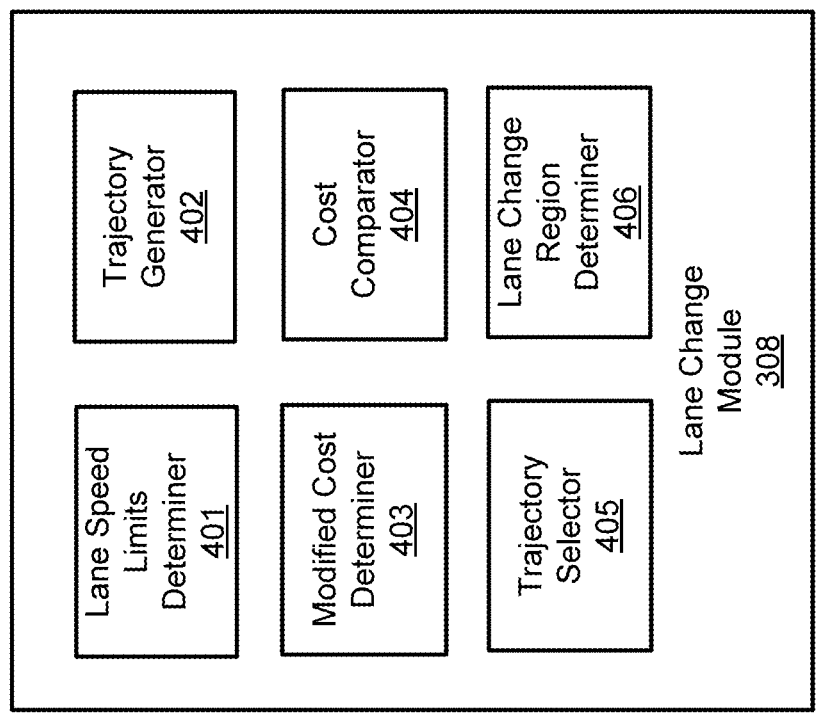
FIG. 4 is a block diagram illustrating a speed limit lane module according to one embodiment.

FIG. 4 is a block diagram illustrating an example of a lane change module according to one embodiment. Lane change module 308 may be implemented as part of planning module 305 of FIG. 3A. Lane change module 308 can generate a trajectory for a lane change for an ADV driving on a road with lanes having different speed limits. Referring to FIG. 4, lane change module 308 may include submodules such as lane speed limit determiner 401, modified trajectory generator 402, modified cost determiner 403, cost comparator 404, trajectory selector 405, and lane change region determiner 406. Modules 401-406 may be integrated into fewer numbers of modules or a single module.

Lane speed limit determiner 401 can determine a speed limit for a lane. Lane speed limit determiner 401 may retrieve data from map & route data 311 of FIG. 3A. Based on a location of ADV, determiner 401 can determine the current roadway for ADV 101. Determiner 401 can retrieve information for the roadway including speed limits for each lane, the lane change regions (e.g., lanes separate by dashed lines indicating lane change is allowed) for the roadway. Trajectory generator 402 can generate a number of trajectories to control the ADV 101. Modified cost determiner 403 can determine a planning cost for each trajectory. In one embodiment, determiner 403 can modify a speed of a trajectory for planning cost calculations. Cost comparator 404 can compare the planning costs for each trajectory. Trajectory selector 405 can select a trajectory based on the compared planning costs to control ADV 101. Lane change region determiner 406 can determine if a road lane/region allows ADV 101 to change lanes and where the region ends, e.g., if there are dashed lane lines.

Figure 5A:
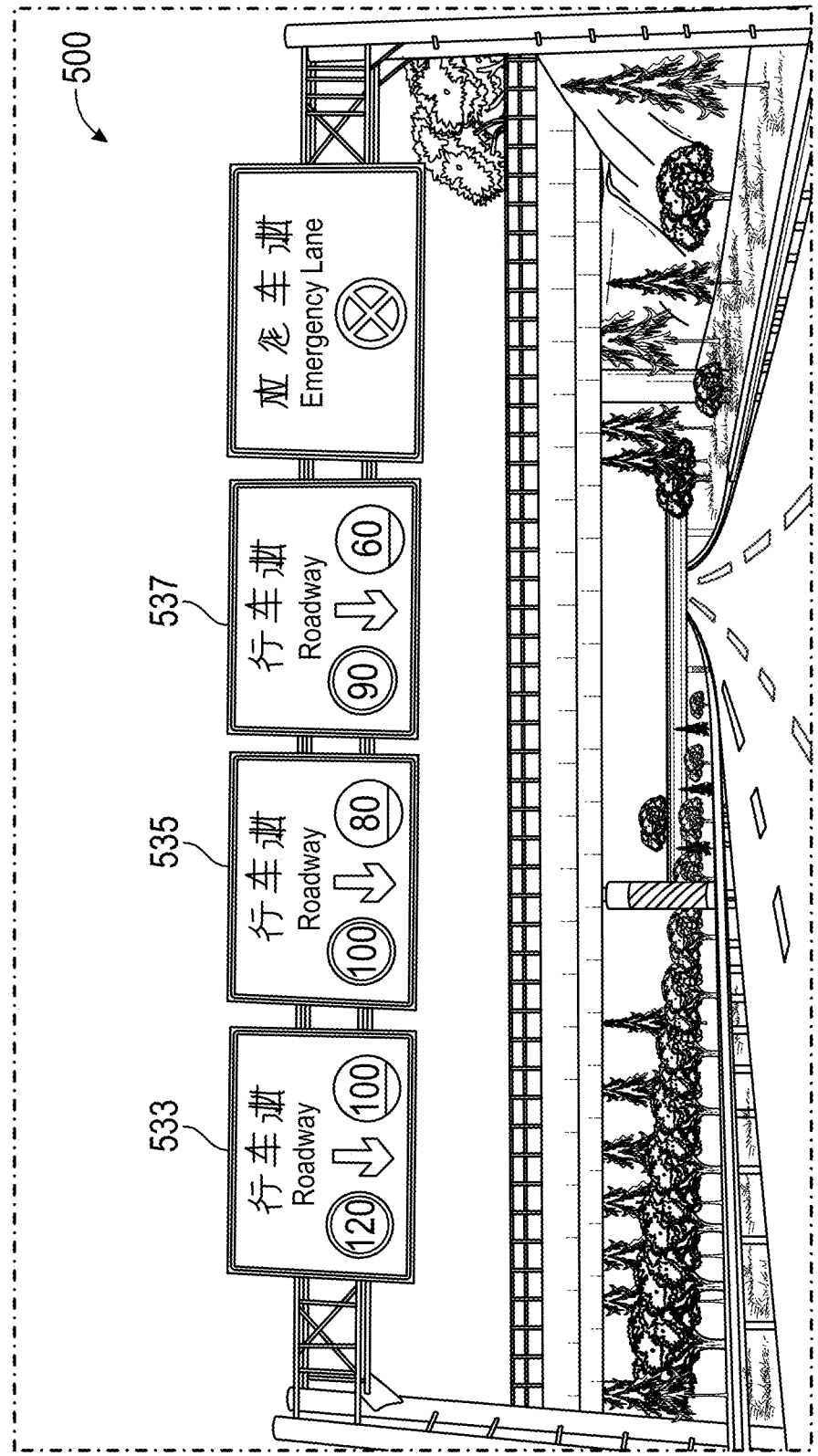
FIG. 5A illustrates a road with three lanes of different speed limits according to one embodiment.

FIG. 5A illustrates a road with three lanes of different speed limits according to one embodiment. Referring to FIG. 5A, road/freeway 500 has lanes 533, 535, and 537. Lane 533 has a speed limit of 120 km/h, lane 535 has a speed limit of 100 km/h, and lane 537 has a speed limit of 90 km/h. ADV 101 may be travelling on any of lanes 533, 535, and 537. For one example, ADV 101 may be travelling along lane 533 at 120 km/h with a planned route that requires ADV to exit roadway/freeway 500 at a next freeway exit (not shown). However, a planning system of ADV 101 is incentivized to stay on lane 533 because it is the quickest route to get to a destination. In this case, ADV 101 may be forced to change lanes seconds prior to the freeway exit (not shown) when a routing system of ADV 101 indicates that ADV 101 must change lanes or else ADV 101 will miss the freeway exit. Although a freeway is shown, road 500 can be any types of road and a lane change may be suitable not just for freeway exits but to make a left/right turn, u-turn, etc.

Figure 5B:
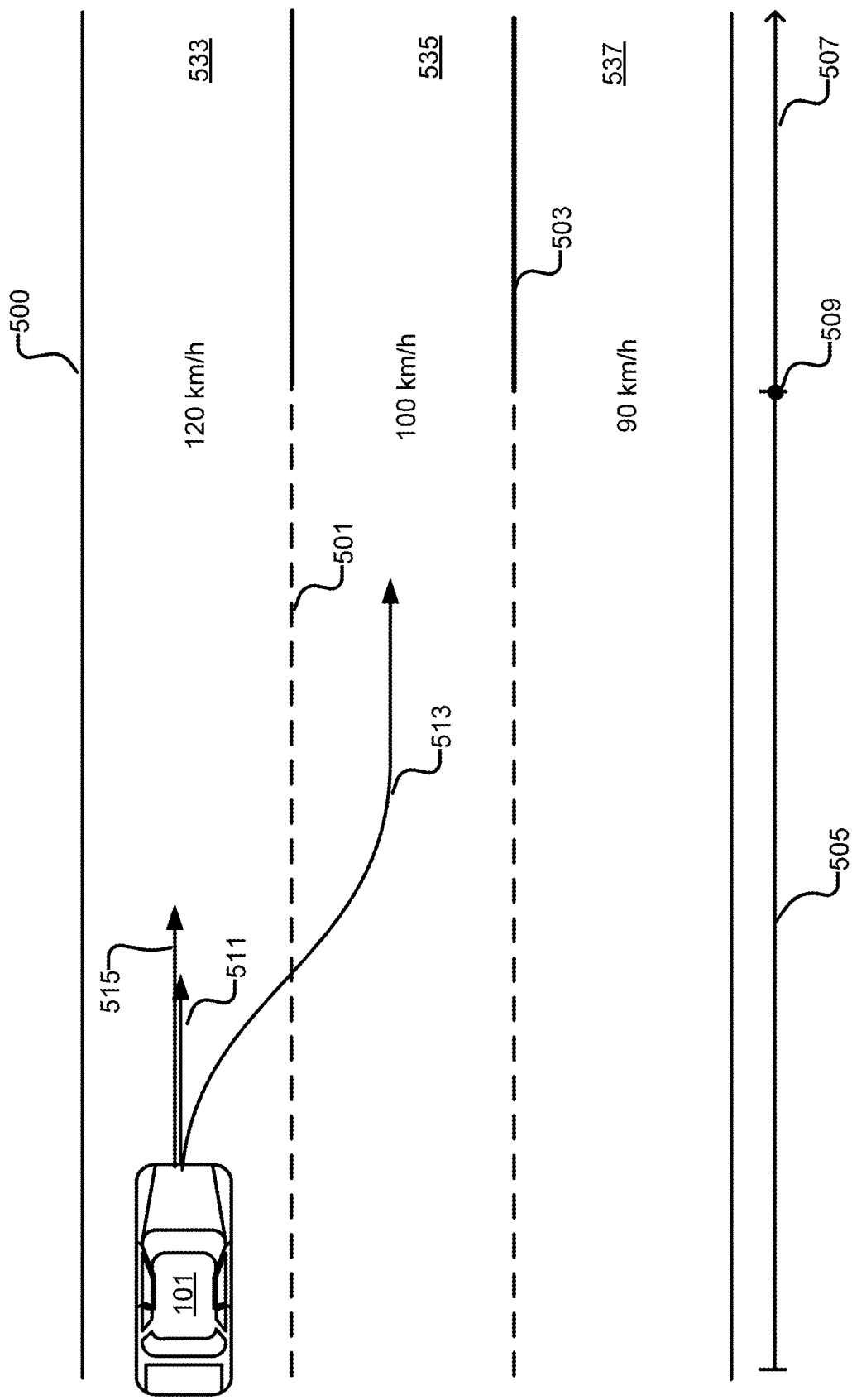
FIG. 5B is a block diagram illustrating a lane change for the road of FIG. 5A according to one embodiment

FIG. 5B is a block diagram illustrating a lane change for the road of FIG. 5A according to one embodiment. Referring to FIG. 5B, ADV 101 may be cruising along lane 533 at approximately the speed limit of 120 km/h for lane 533. In one embodiment, ADV 101 may determine from perception or map & route data, such as map & route data 311 of FIG. 3A, that roadway 500 has three lanes 533, 535, and 537. Lane 533 has a speed limit of 120 km/h, lane 535 has a speed limit of 100 km/h, and lane 537 has a speed limit of 90 km/h. ADV 101 may have planned a route that requires to exit roadway/freeway 500 in a subsequent freeway exit (not shown).

In one embodiment, ADV 101 can determine road regions before the freeway exit that allow lane changes (e.g., region 505). Here, region 505 has dashed lane lines 501 indicating a driver may change lanes if safe to do so, whereas, region 507, with solid lane lines 503, requires drivers to stay within their lanes. Next, before a lane change region endpoint 509, or an end of a lane change region, or before the freeway exit (not shown), ADV 101 generates a first trajectory 511 corresponding to ADV 101 staying within lane 533 (source lane) and a second trajectory 513 corresponding to ADV 101 changing lanes from lane 533 (source lane) to lane 535 (target lane).

In one embodiment, the first and the second trajectories 511-513 are generated at a predetermined distance (or time) threshold (e.g., 20-40 seconds) before the lane change region endpoint 509 (or a freeway exit (not shown)) (e.g., distance=a current speed limit divided by a velocity of ADV 101). In one embodiment, the first trajectory 511 has a modified speed corresponding to the speed limit of the target lane (e.g., lane 535 at 100 km/h). The second trajectory 513 has a speed corresponding to the speed limit of lane 535 (e.g., 100 km/h). This way, the comparison reduces a chance that ADV 101 automatically selects a lane with a higher speed, e.g., lane 533. Note that the predetermined time threshold (e.g., 20-40 seconds) can be determined to be less than the time required for ADV 101 to change lanes and to return from the target lane to the source lane so that ADV stays at the target lane after a lane change.

In one embodiment, a cost is calculated for each of the first and the second trajectories 511-513 for cost comparisons. In one embodiment, the cost can be calculated based on a planning cost function. An example of a planning cost function can be:

$$\text{Total\_cost} \propto \text{length\_of\_trajectory} * \text{weight\_length\_of\_trajectory} + \\ \text{velocity\_exit\_trajectory} * \text{weight\_velocity\_exit\_velocity} + \\ \text{boolean\_trajectory\_is\_lane\_change} * \text{weight\_lane\_change}$$

where, length_of_trajectory indicates a distance the trajectory will cover, weight_length_of_trajectory is a weight factor for length_of_trajectory, velocity_exit_trajectory is the velocity at an end point of the trajectory (e.g., the final speed of ADV 101 for the planned trajectory), weight_velocity_exit_velocity is a weight factor for velocity_exit_trajectory, boolean_trajectory_is_lane_change is 1 if the trajectory involves a lane change, or 0 if the trajectory continues in a current lane, and weight_lane_change is a weight factor for boolean_trajectory_is_lane_change.

Here, the cost for a trajectory decreases if a greater distance is covered by the trajectory, or a greater speed is achieved at an endpoint of the trajectory, or the trajectory is a lane change trajectory. Based on the calculated costs, if the second trajectory has a lower cost compared to the first trajectory, a planning system of ADV 101 can control ADV 101 according to the second trajectory to change lanes from the source lane to the target lane.

In one embodiment, if the first trajectory has a lower cost compared to the second trajectory (e.g., a planning decision to stay in a current lane), ADV 101 generates a third trajectory 515 for the ADV to follow the source lane 533 having the source lane speed limit of 120 km/h. Here, the third trajectory 515 has a speed corresponding to the source lane speed limit of 120 km/h and has the same path as the first trajectory 511. ADV 101 can determine a third cost for the third trajectory 515 based on the cost function. ADV 101 can compare the costs for the first trajectory to the third trajectory and if the third trajectory has a lower cost than the first trajectory, a planning system of ADV 101 controls ADV 101 according to the third trajectory, otherwise, a planning system of ADV 101 controls ADV 101 according to the first trajectory.

Figure 6:
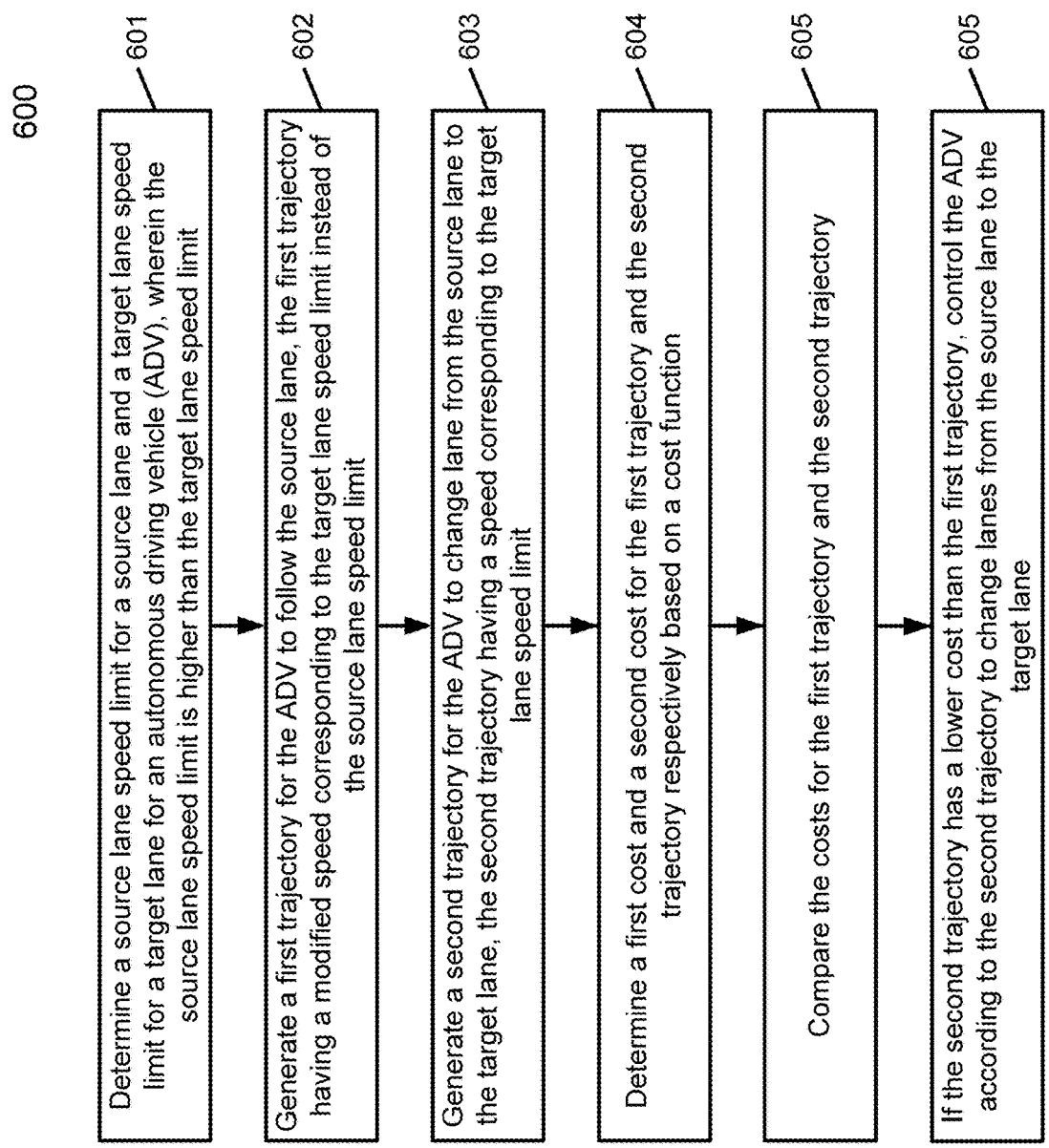
FIG. 6 is a flow diagram illustrating a method according to one embodiment.

FIG. 6 is a flow diagram illustrating a method according to one embodiment. Processing 600 may be performed by processing logic which may include software, hardware, or a combination thereof. For example, process 600 may be performed by pedestrian module 308 of FIG. 3A. Referring to FIG. 6, at block 601, processing logic determines a source lane speed limit for a source lane and a target lane speed limit for a target lane for an autonomous driving vehicle (ADV), where the source lane speed limit is greater than the target lane speed limit. At block 602, processing logic generates a first trajectory for the ADV to follow the source lane, the first trajectory having a modified speed corresponding to the target lane speed limit instead of the source lane speed limit. At block 603, generating a second trajectory for the ADV to change lane from the source lane to the target lane, the second trajectory having a speed corresponding to the target lane speed limit. At block 604, processing logic determines a first cost and a second cost for the first trajectory and the second trajectory respectively based on a cost function. At block 605, processing logic compares the costs for the first trajectory and the second trajectory. At block 606, if the second trajectory has a lower cost than the first trajectory, processing logic controls the ADV according to the second trajectory to change lanes from the source lane to the target lane.

In one embodiment, the cost function includes cost factors based on a distance covered by the trajectory, a speed at an endpoint of the trajectory, and whether the trajectory includes a lane change. In one embodiment, the cost for the trajectory decreases if a greater distance is covered, a greater speed at the endpoint of the trajectory, or the trajectory is a lane change trajectory.

In one embodiment, if the first trajectory has a lower cost, processing logic further generates a third trajectory for the ADV to follow the source lane having the source lane speed limit, the third trajectory having a speed corresponding to the source lane speed limit; determines a third cost for the third trajectory based on the cost function; and compares the costs for the first trajectory to the third trajectory. If the third trajectory has a lower cost than the first trajectory, processing logic controls the ADV according to the third trajectory, otherwise, processing logic controls the ADV according to the first trajectory.

In one embodiment, processing logic further determines that the ADV is a threshold distance away from an endpoint of a lane change region. In one embodiment, the threshold distance corresponds to a predetermined time threshold so the ADV would not return to the source lane after a lane change. In one embodiment, the source lane and the target lane are adjacent lanes of a roadway.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to operate an autonomous driving vehicle (ADV), comprising:
    generating a first trajectory for the ADV to follow a source lane at a target lane speed limit of a target lane, the source lane being associated with a source lane speed limit that is greater than the target lane speed limit, wherein the target lane speed limit is not influenced by a speed of a vehicle in the target lane;
    generating a second trajectory for the ADV to change lane from the source lane to the target lane at the target lane speed limit;
    determining a first cost and a second cost for the first trajectory and the second trajectory respectively based on a rule-based cost function, wherein the cost function includes one or more cost factors based on a distance of the first or second trajectory and a speed at only an endpoint of the first or second trajectory, wherein the second cost is less than the first cost if a speed at the endpoint of the second trajectory is greater than a speed at the endpoint of the first trajectory; and
    in response to determining that the second cost is lower than the first cost, controlling the ADV according to the second trajectory to change lanes from the source lane to the target lane.

2. The method of claim 1, wherein the cost function includes one or more cost factors based on whether the first or second trajectory includes a lane change.

3. The method of claim 2, wherein the second cost is less than the first cost if the second trajectory has a distance greater than a distance of the first trajectory, or if the second trajectory is a lane change trajectory.

4. The method of claim 1, further comprising:
    if the first cost is less than the second cost, generating a third trajectory for the ADV to follow the source lane at the source lane speed limit;
    determining a third cost for the third trajectory based on the cost function; and
    in response to determining that the third cost is less than the first cost, controlling the ADV according to the third trajectory, or
    in response to determining that the third cost is greater than or equal to the first cost, controlling the ADV according to the first trajectory.

5. The method of claim 1, further comprising determining that the ADV is within a threshold distance away from an endpoint of a lane change region.

6. The method of claim 5, wherein the ADV being within the threshold distance away from the endpoint of the lane change region indicates the ADV would not perform a lane change from the target lane back to the source lane.

7. The method of claim 1, wherein the source lane and the target lane are adjacent lanes of a roadway.

8. A non-transitory machine-readable medium having instructions stored therein, which when executed by a processor, cause the processor to perform operations of operating an autonomous driving vehicle (ADV), the operations comprising:
    generating a first trajectory for the ADV to follow a source lane at a target lane speed limit of a target lane to which the ADV intends to change, the source lane being associated with a source lane speed limit that is greater than the target lane speed limit, wherein the target lane speed limit is not influenced by a speed of a vehicle in the target lane;
    generating a second trajectory for the ADV to change lane from the source lane to the target lane at the target lane speed limit;
    determining a first cost and a second cost for the first trajectory and the second trajectory respectively based on a cost function, wherein the rule-based cost function includes one or more cost factors based on a distance of the first or second trajectory and a speed at only an endpoint of the first or second trajectory, wherein the second cost is less than the first cost if a speed at the endpoint of the second trajectory is greater than a speed at the endpoint of the first trajectory; and
    in response to determining that the second cost is lower than the first cost, controlling the ADV according to the second trajectory to change lanes from the source lane to the target lane.

9. The non-transitory machine-readable medium of claim 8, wherein the cost function includes one or more cost factors based on whether the first or second trajectory includes a lane change.

10. The non-transitory machine-readable medium of claim 9, wherein the second cost is less than the first cost if the second trajectory has a distance greater than a distance of the first trajectory, or if the second trajectory is a lane change trajectory.

11. The non-transitory machine-readable medium of claim 8, wherein the operations further comprise:
    if the first cost is less than the second cost, generating a third trajectory for the ADV to follow the source lane at the source lane speed limit;
    determining a third cost for the third trajectory based on the cost function; and
    in response to determining that the third cost is less than the first cost, controlling the ADV according to the third trajectory, or
    in response to determining that the third cost is greater than or equal to the first cost, controlling the ADV according to the first trajectory.

12. The non-transitory machine-readable medium of claim 8, wherein the operations further comprise determining that the ADV is within a threshold distance away from an endpoint of a lane change region.

13. The non-transitory machine-readable medium of claim 12, wherein the ADV being within the threshold distance away from the endpoint of the lane change region indicates the ADV would not perform a lane change from the target lane back to the source lane.

14. The non-transitory machine-readable medium of claim 8, wherein the source lane and the target lane are adjacent lanes of a roadway.

15. A data processing system, comprising:
a processor; and
a memory coupled to the processor to store instructions, which when executed by the processor, cause the processor to perform operations of operating an autonomous driving vehicle (ADV), the operations including
generating a first trajectory for the ADV to follow a source lane at a target lane speed limit of a target lane to which the ADV intends to change, the source lane being associated with a source lane speed limit that is greater than the target lane speed limit, wherein the target lane speed limit is not influenced by a speed of a vehicle in the target lane;
generating a second trajectory for the ADV to change lane from the source lane to the target lane at the target lane speed limit;
determining a first cost and a second cost for the first trajectory and the second trajectory respectively based on a rule-based cost function, wherein the cost function includes one or more cost factors based on a distance of the first or second trajectory and a speed at only an endpoint of the first or second trajectory, wherein the second cost is less than the first cost if a speed at the endpoint of the second trajectory is greater than a speed at the endpoint of the first trajectory; and
in response to determining that the second cost is lower than the first cost, controlling the ADV according to the second trajectory to change lanes from the source lane to the target lane.

16. The system of claim 15, wherein the cost function includes one or more cost factors based on whether the first or second trajectory includes a lane change.

17. The system of claim 16, wherein the second cost is less than the first cost if the second trajectory has a distance greater than a distance of the first trajectory, or if the second trajectory is a lane change trajectory.

18. The system of claim 15, wherein the operations further comprise:
if the first cost is less than the second cost, generating a third trajectory for the ADV to follow the source lane at the source lane speed limit;
determining a third cost for the third trajectory based on the cost function; and
in response to determining that the third cost is less than the first cost, controlling the ADV according to the third trajectory, or
in response to determining that the third cost is greater than or equal to the first cost, controlling the ADV according to the first trajectory.

19. The system of claim 15, further comprising determining that the ADV is within a threshold distance away from an endpoint of a lane change region.

20. The system of claim 19, wherein the ADV being within the threshold distance away from the endpoint of the lane change region indicates the ADV would not perform a lane change from the target lane back to the source lane.

21. The system of claim 15, wherein the source lane and the target lane are adjacent lanes of a roadway.

* * * * *